United States Patent
Iwamoto (10) Patent No.: US 6,397,265 B1
(45) Date of Patent: *May 28, 2002

(54) PRINT CONTROL APPARATUS FOR COMMUNICATING WITH A SELECTED EXTERNAL APPARATUS TO CONTROL A PRINTER

(75) Inventor: Shinichi Iwamoto, Ohmiya (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/986,307

(22) Filed: Dec. 5, 1997

Related U.S. Application Data (63) Continuation of application No. 08/338,732, filed on Nov. 9, 1994, now abandoned.

(30) Foreign Application Priority Data

Nov. 12, 1993 (JP) .............................. 5-283297

(51) Int. Cl.$^7$ ................................ G06F 3/00
(52) U.S. Cl. ............... 710/1; 710/12; 710/62; 710/65
(58) Field of Search ................ 710/1, 12, 62, 710/65; 395/101, 789; 707/513; 358/1.11, 1.18; 345/467, 468

(56) References Cited

U.S. PATENT DOCUMENTS

| | | | | |
|---|---|---|---|---|
| 476,486 A | | 8/1892 | Ketelhut et al. ............... 710/12 |
| 3,991,114 A | * | 11/1976 | Kawamura et al. ......... 564/267 |
| 4,196,450 A | * | 4/1980 | Miller et al. ................. 356/256 |
| 4,223,380 A | * | 9/1980 | Antonaccio et al. |
| 4,745,561 A | * | 5/1988 | Hirosawa et al. ........... 345/471 |
| 4,764,486 A | * | 8/1988 | Ketelhut et al. ............... 710/12 |
| 4,825,402 A | * | 4/1989 | Jalali .......................... 710/12 |
| 4,885,703 A | * | 12/1989 | Deering ....................... 345/422 |
| 5,043,918 A | | 8/1991 | Murahashi ................... 395/115 |
| 5,047,923 A | * | 9/1991 | Elstner et al. .............. 707/104 |
| 5,218,679 A | * | 6/1993 | Hasegawa et al. ............ 710/12 |
| 5,269,013 A | | 12/1993 | Abramson et al. .......... 711/170 |
| 5,297,876 A | * | 3/1994 | Imagawa ..................... 395/116 |
| 5,303,336 A | * | 4/1994 | Kageyama et al. ......... 395/114 |
| 5,355,441 A | * | 10/1994 | Kawai et al. ................ 395/115 |
| 5,511,225 A | * | 4/1996 | Gohl et al. .................... 710/1 |
| 5,751,430 A | * | 5/1998 | Koike ......................... 368/296 |

* cited by examiner

Primary Examiner—Ayaz R. Sheikh
Assistant Examiner—Ario Etienne
(74) Attorney, Agent, or Firm—Fitzpatrick, Cella, Harper & Scinto (57) ABSTRACT

An output apparatus for receiving input data from an information processing apparatus through a network and for forming and outputting output data, comprises: a substituting unit for substituting a process to form the output data from the input data to a function of another output apparatus through the network; and an outputting unit for obtaining the data derived by substituting the process to the another output apparatus and for forming and outputting the output data.

22 Claims, 5 Drawing Sheets

PRINT CONTROL APPARATUS FOR COMMUNICATING WITH A SELECTED EXTERNAL APPARATUS TO CONTROL A PRINTER

This is a Con. of 08/338,732 Nov. 9, 1994 now abandoned,

BACKGROUND OF THE INVENTION

1. Field of the Invention

The present invention relates to output apparatus and output method for communicating data with an external apparatus such as a host computer or the like or another output apparatus such as a printer or the like through a predetermined network.

2. Related Background Art

Figure 7:
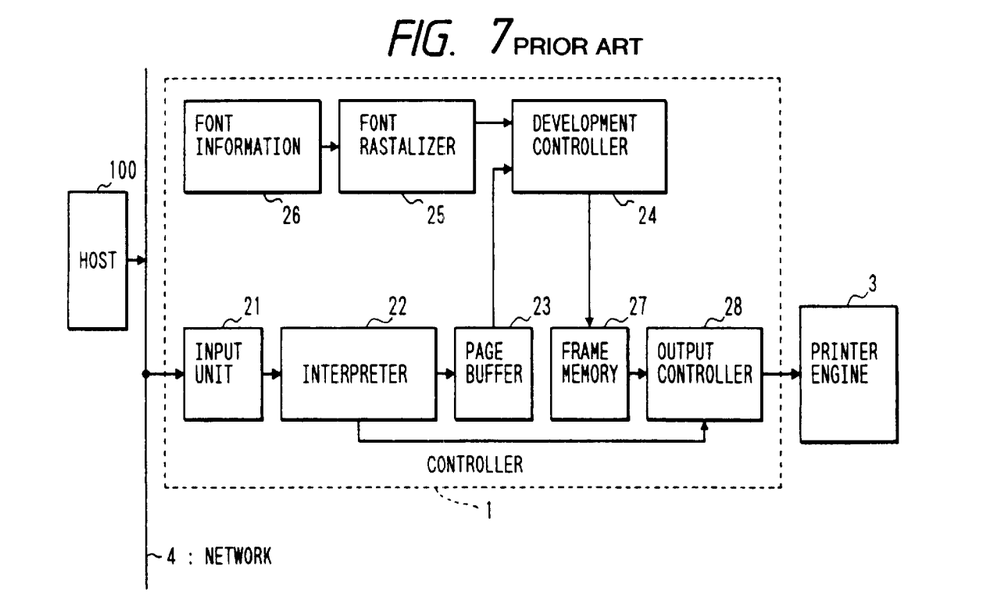
FIG. 7 is a system block diagram of a conventional printer with a host computer.

FIG. 7 shows a block construction of a printing apparatus which has been known hitherto. In the diagram, reference numeral 100 denotes a host apparatus for transmitting input data (character code, control code) or the like to a controller 1 through a network 4. Reference numeral 1 denotes the controller for executing necessary data processes to the data which was inputted from the host apparatus 100 though the network 4 and outputting the processed data to a printer engine 3. Reference numeral 3 indicates the printer engine for printing and outputting bit map data from the controller 1 by designated format and resolution. Reference numeral 4 denotes the network for connecting the host apparatus 100 and the controller 1.

In the controller 1, reference numeral 21 denotes an input unit for receiving the data or the like from the host apparatus 100 through the network 4; 22 an interpreter to analyze the input data inputted from the host apparatus 100 by the input unit 21; 23 a page buffer for analyzing the input data and storing resultant intermediate data formed; 24 a development controller for outputting the intermediate data from the page buffer 23 to a frame memory 27 and for receiving pattern data from a font rastalizer 25 and outputting to the frame memory 27 for a character code as intermediate data in the page buffer 23; 25 the font rastalizer (program) which is called from the development controller 24 for the character data in the page buffer 23 and which receives drawing information corresponding to the character data from a font information unit 26 and develops to pattern data: 26 the font information unit having a dot font and an outline font in correspondence to a character code for the font rastalizer 25; 27 the frame memory; and 28 an output controller for outputting the bit map data in the frame memory 27 to the printer engine 3.

According to the conventional printing apparatus with the construction mentioned above, the input data transmitted from the host apparatus 100 is received by the input unit 21 and the input data is interpreted by the interpreter 22. The input data is converted into the intermediate data and the intermediate data is stored in the page buffer 23.

Subsequently, the development controller 24 reads out the intermediate data stored in the page buffer 23. When there is a character code, the font rastalizer 25 is called and a font pattern is formed and stored into the frame memory 27 as, for example, bit map data of one page.

The font rastalizer 25 is called by the development controller 24 every character code as intermediate data in the page buffer 23, forms a font pattern by extracting character information corresponding to the character code from the font information unit 26, and supplies the font pattern to the development controller 24.

On the other hand, control information regarding a printing environment is also included in the intermediate data of one page in the page buffer 23. The output controller 28 sends the bit map image in the frame memory 27 to the output controller 28 in accordance with the above control information, controls the printer engine 3, thereby printing and outputting the bit map image onto a recording paper.

In the conventional apparatus as mentioned above, however, there are the following drawbacks since the control system of the printer controller isn't constructed as a module and cannot be used as a function.

(1) When the print data is previewed, since the data is displayed by a previewer on the host side, the printed and outputted image cannot be accurately previewed.

(2) When a plurality of printers are connected in the network, the resources (functions) of the printers cannot be commonly used.

SUMMARY OF THE INVENTION

It is an object of the invention to provide output apparatus and output method for forming and outputting output data by using data which is obtained by allowing a function of another output apparatus to substitute a process.

In order to solve such a subject, according to the invention, the above object is accomplished by an output apparatus for inputting input data from an information processing apparatus through a network and for forming and outputting output data, comprising: substituting means for substituting a process to form the output data from the input data to a function of another output apparatus through the network; and outputting means for obtaining the data obtained by substituting the process to another output apparatus and for forming and outputting the output data.

In order to solve such a subject, according to the invention, the above object is accomplished by an output method of inputting input data from an information processing apparatus through a network and forming and outputting output data, wherein a process to form the output data from the input data is substituted by a function of another output apparatus through the network and the data obtained by substituting the process to another output apparatus is derived and the output data is formed and outputted.

DETAILED DESCRIPTION OF THE PREFERRED EMBODIMENTS

Prior to explaining a construction of the embodiment, constructions of a laser beam printer and an ink jet printer to which an embodiment is applied will now be explained with reference to FIGS. 1 to 3. It will be obviously understood that a printer to which the embodiment is applied is not limited to a laser beam printer and an ink jet printer but the other printers can be also used.

Figure 1:
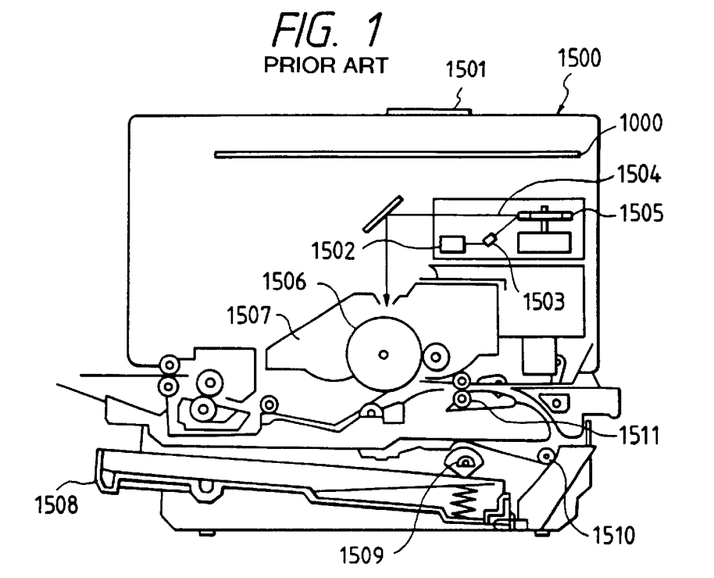
FIG. 1 is a cross sectional view of a first prior art printer to which the invention can be applied.

FIG. 1 is a cross sectional view showing a construction of a first output apparatus to which the invention can be applied. For example, FIG. 1 shows the case of a laser beam printer (LBP).

In the diagram, reference numeral 1500 denotes an LBP main body for inputting and storing print information (character code or the like) and form information or macro command, or the like which are supplied from a host computer which is connected to the outside, and also for forming a corresponding character pattern, form pattern or the like in accordance with those information, thereby forming an image on a recording paper as a recording medium. Reference numeral 1501 indicates an operation panel on which a switch, an LED display, and the like for operation are arranged; and 1000 a printer control unit for controlling the whole LBP main body 1500 and analyzing the character information or the like which is supplied from the host computer. The printer control unit 1000 mainly converts the character information to the video signal of a corresponding character pattern and outputs the video signal to a laser driver 1502. The laser driver 1502 is a circuit to drive a semiconductor laser 1503 and on/off switches a laser beam 1504 emitted from the semiconductor laser 1503 in accordance with the inputted video signal. The laser beam 1504 is swung to the right and left by a rotary polygon mirror 1505 and scans and exposes on an electrostatic drum 1506. Consequently, an electrostatic latent image of the character pattern is formed on the electrostatic drum 1506. The latent image is developed by a developing unit 1507 arranged around the electrostatic drum 1506 and, after that, it is transferred onto the recording paper. A cut sheet is used as a recording paper. The cut sheet recording papers are enclosed in a sheet cassette 1508 set in the LBP 1500 and are picked up one by one into the apparatus by a feed roller 1509 and conveying rollers 1510 and 1511 and is conveyed to the electrostatic drum 1506.

Figure 2:
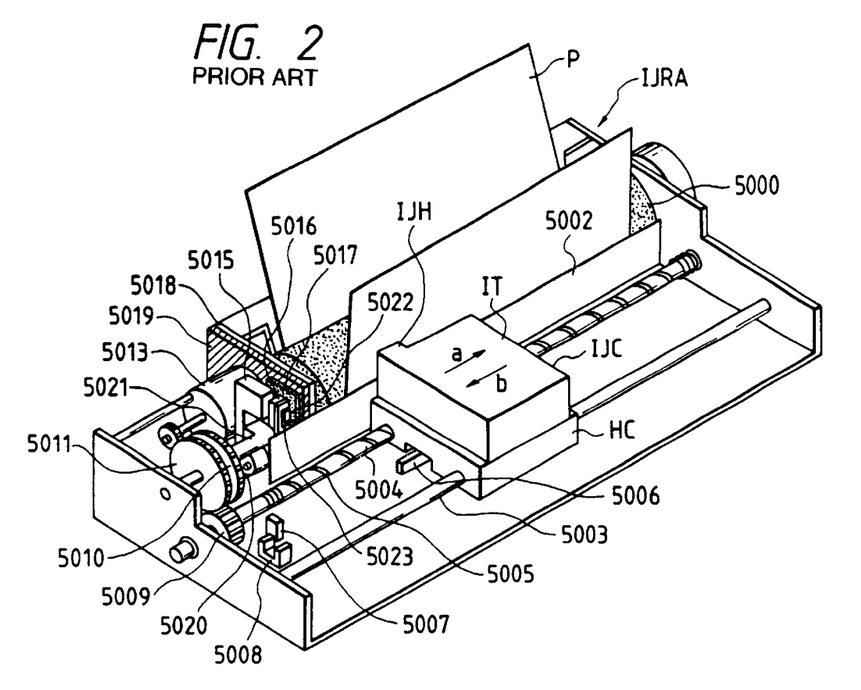
FIG. 2 is an external view of a second prior art printer to which the invention can be applied.

FIG. 2 is an external view showing a construction of a second output apparatus to which the invention can be applied. For example, FIG. 2 shows the case of an ink jet printer.

In the diagram, a lead screw 5005 is rotated through driving force transfer gears 5011 and 5009 in an interlocking relation with the forward/reverse rotation of a drive motor 5013. A carriage HC which is come into engagement with spiral grooves 5004 of the lead screw 5005 has a pin (not shown) and is reciprocatingly moved in the directions shown by arrows (a) and (b). An ink jet cartridge IJC is mounted on the carriage HC. Reference numeral 5002 denotes a paper pressing plate to press the paper onto a platen 5000 in the carriage moving direction. Reference numerals 5007 and 5008 indicate photocouplers function as home position detecting means confirming the existence of a lever 5006 of the carriage in an area of the photocouplers and executing the switching operation of the rotating direction of the motor 5013 or the like. Reference numeral 5016 denotes a member to instruct a cap member 5022 to cap the whole surface of a recording head. Reference numeral 5015 denotes sucking means for sucking the inside of the cap. The sucking means executes a sucking recovery of the recording head through an opening 5023 in the cap. Reference numeral 5017 indicates a cleaning blade which can be moved in the front/rear direction by a member 5019; 5018 a main body supporting plate for supporting the cleaning blade 5017 and member 5019; and 5021 a lever to start the sucking of the sucking recovery. The lever is moved in association with the movement of a cam 5020 which is come into engagement with the carriage. The driving force from the driving motor is transferred by well-known transmitting means such as a clutch switching or the like.

Although the apparatus is constructed in a manner such that a desired process among the capping, cleaning, and sucking recovery can be executed at a position corresponding to such a process by the operation of the lead screw 5005 when the carriage comes to the region on the home position side, it is sufficient to construct the apparatus in a manner such that a desired operation is executed at a well-known timing.

Figure 3:
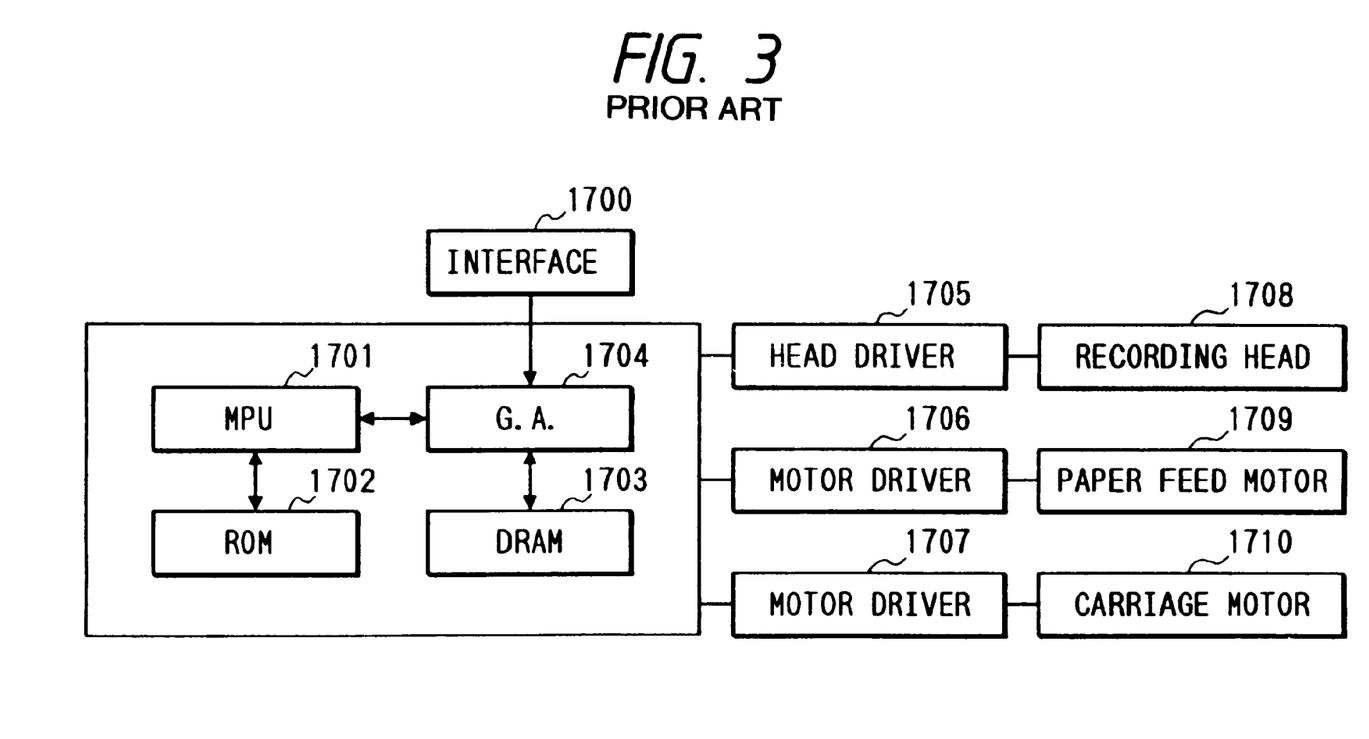
FIG. 3 is a system block diagram of the prior art printer shown in FIG. 2.

FIG. 3 is a block diagram to explain a control construction of the second output apparatus shown in FIG. 2.

In the diagram, reference numeral 1700 denotes an interface to input a recording signal; 1701 an MPU; 1702 a program ROM to store a control program and the like which are executed by the MPU 1701; 1703 a DRAM to store various data (the recording signal, recording data which is supplied to a head, and the like); 1704 a gate array to supply the recording data to a recording head 1708 and also to execute a transfer control of data among the interface 1700, MPU 1701, and DRAM 1703; 1710 a carriage motor to convey the recording head 1708; 1709 a paper feed motor for conveying the recording paper; 1705 a head driver to drive the recording head; 1706 a motor driver to drive the paper feed motor 1709; and 1707 a motor driver to drive the carriage motor 1710.

In each of the output apparatuses constructed as mentioned above, when the recording signal is inputted from the host computer through the interface 1700, the recording signal is converted to the recording data for printing between the gate array 1704 and the MPU 1701. As the motor drivers 1706 and 1707 are driven, the recording head is driven in accordance with the recording data sent to the head driver 1705 and the printing operation is executed.

The MPU 1701 can perform the bidirectional communicating process with the host computer or another printer through the interface 1700.

Each embodiment of the invention will now be described in detail hereinbelow.

Embodiment 1

Figure 4:
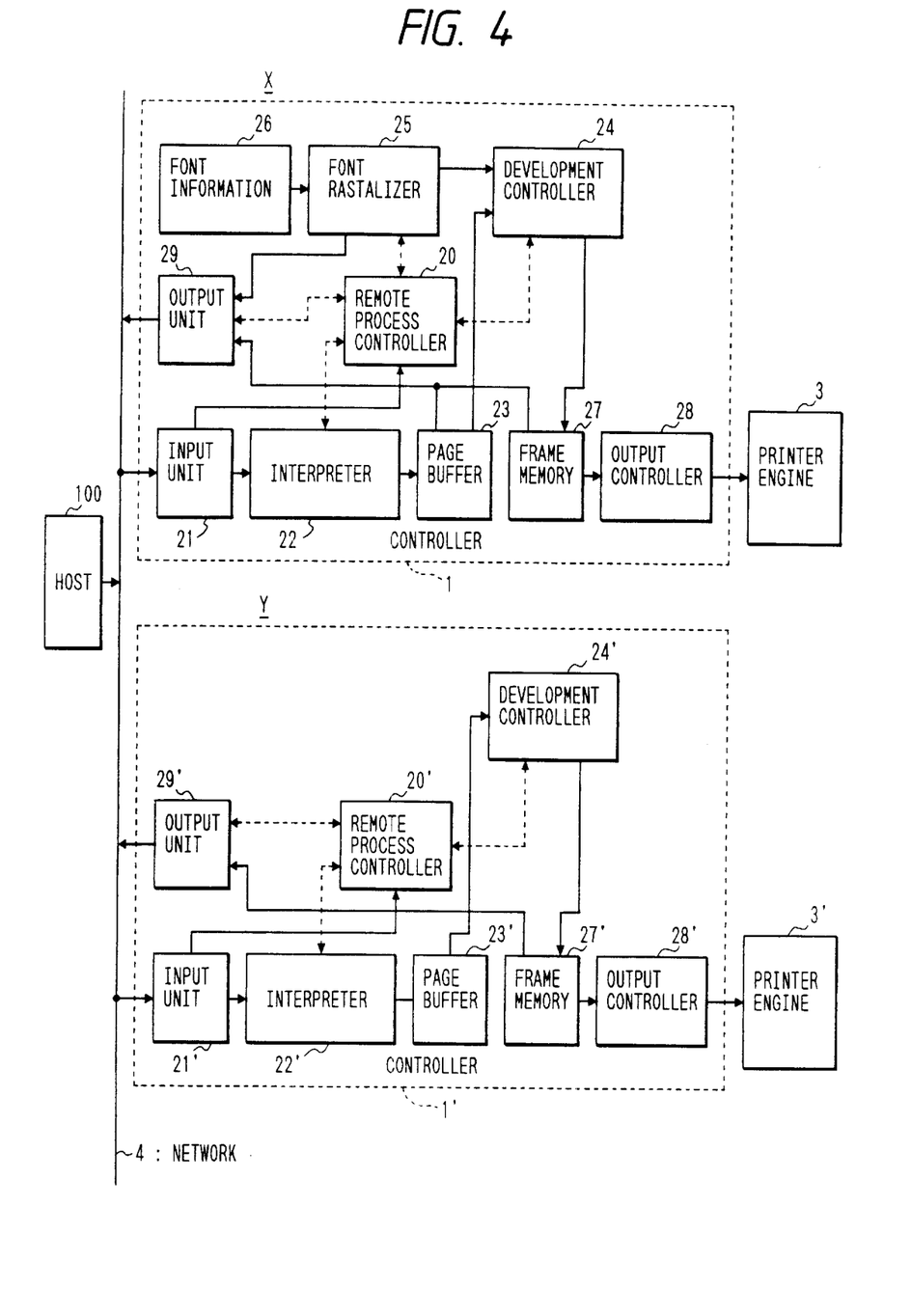
FIG. 4 is a system block diagram of the first embodiment.

FIG. 4 shows an embodiment of the invention. This diagram shows an example such that two printers one of which is shown in FIG. 1 are connected to the network 4.

It is also possible to construct in a manner such that two printers one of which is shown in FIG. 2 are connected to the network or that the printer shown in FIG. 1 and the printer shown in FIG. 2 are mixedly connected to the network.

The controllers and printer engines of the printers are distinguished by adding ' after the reference numerals in a manner such as (1, 1') and (3, 3'). However, such a distinction is a matter of expression and the functions don't differ. The controller 1 and printer engine 3 in FIG. 4 differ from the conventional apparatus shown in FIG. 7 with respect to a point that the controller 1 includes a remote process controller 20 and an output unit 29.

In FIG. 4, reference numeral 20 denotes the remote process controller comprising a CPU for controlling the component elements in the controller 1 such as interpreter 22, development controller 24, font rastalizer (program) 25, and the like in accordance with a remote process request command received from the input unit 21. The remote process controller 20 outputs intermediate data in the page buffer 23 formed by executing the above component elements, font pattern data formed by the font rastalizer 25, and bit map data in the frame memory 27 to the output unit 29. In the embodiment, the font rastalizer is a program to form a font pattern by using font information such as dot font, outline font, or the like.

The remote process controller 20 can also request similar component elements in another printer in the network and can allow the component elements in such another printer to remote execute (substitute) the actual operation. Reference numeral 29 indicates the output unit for outputting the intermediate data in the page buffer 23 formed by the control of the remote process controller 20, the font pattern data formed by the font rastalizer 25, and the bit map data in the frame memory 27 to the network 4.

The intermediate data which is stored in the page buffer 23 is the data obtained by converting the input data (such as character code, control code, and the like) inputted from the host computer 100 into the data which can be easily developed to the bit map data. The development controller 24 develops the intermediate data of one page stored in the page buffer 23 to the bit map data and stores into the frame memory 27.

Different from the case of FIG. 7, the input unit 21 is also connected to another printer through the network 4. The printer controller 1 can bidirectionally communicate data with a printer controller 1' through the input unit 21 and output unit 29. Similarly, the printer controller 1' can bidirectionally communicate data with the printer controller 1 through an input unit 21' and an output unit 29'.

Prior to describing the operation of the embodiment, the print output for the input data (comprising character code, control code, and the like) inputted to the input unit 21 from the host apparatus 100 is omitted here because it is the same as the operation of the conventional apparatus. The input data is a printer language such as a page description language (PDL) or the like.

The embodiment will be explained with respect to an example in the case where the printer constructed by the controller 1' and a printer engine 3' is different from the printer constructed by the controller 1 and printer engine 3 and doesn't have the component elements corresponding to the font rastalizer 25 and font information storing unit 26.

For convenience of explanation, the printer constructed by the controller 1 and printer engine 3 is called a printer (X) and the printer constructed by the controller 1' and printer engine 3' is called a printer (Y). The operation when the input data is inputted to the printer (Y) from the host apparatus 100 will now be described hereinbelow.

The input unit 21' of the printer (Y) receives the input data transmitted from the host apparatus 100 through the network 4. Although the subsequent operation is the same as that shown in the conventional apparatus of FIG. 7, when a development controller 24' of the printer (Y) finds a character code in a page buffer 23', the different operation is executed. In this case, since the printer (Y) has no font rastalizer (program), the development controller 24' forms a rastalizer request command so that a remote process controller 20' searches a desired rastalizer (program).

The remote process controller 20' generates the rastalizer request command to the network 4 through the output unit 29'. When the input unit 21 of the printer (X) receives the rastalizer request command generated to the network 4, the request is sent to the remote process controller 20. Since the remote process controller 20 knows that the printer (X) has the font rastalizer 25 which is designated by the rastalizer request command, the remote process controller 20 generates an ACK (acknowledge) command to open a communication path with the printer (Y) through the output unit 29 onto the network 4. Although the printer (X) has the font rastalizer 25, the printer (X) can also have a plurality of kinds of font rastalizers. In this case, the remote process controller 20 selects the font rastalizer designated by the rastalizer request command.

At this time point, the input unit 21' of the printer (Y) receives the ACK command and sends it to the remote process controller 20'. The remote process controller 20' recognizes that the ACK command is a command for-the rastalizer request command, thereby enabling the rastalizer 25 of the printer (X) to be controlled from the printer (Y).

When the development controller 24' of the printer (Y) finds the character code as intermediate data in the page buffer 23', the character code is outputted to the rastalizer 25 of the printer (X) through the output 29'. The rastalizer 25 develops the character code received from the printer (Y) to the pattern data by using the font information unit 26. The remote process controller 20 outputs the pattern data to the printer (Y) through the output unit 29. The development controller 24' stores the pattern data received through the input unit 21' into a frame memory 27' and the printing operation is executed in a manner similar to that of the conventional apparatus of FIG. 7.

A method whereby the development controller 24' of the printer (Y) obtains the character pattern from the character code will now be explained hereinbelow. As mentioned above, since the logical communication path from the printer (Y) to the rastalizer 25 of the printer (X) is open, it is sufficient that the development controller 24' simply executes a function call like "remote-fontraster". When the function call is executed, the remote process controller 20' is called with the character code. The remote process controller 20' outputs a command such as "remote-fontraster-printerX" and the character code onto the network 4 through the output unit 29'.

The input unit 21 of the printer (X) receives the command outputted onto the network 4 and sends it to the remote process controller 20 of the printer (X). The remote process controller 20 receives the "remote-fontraster-printerX" command and the character code and sends the character code to the font rastalizer 25. The font rastalizer 25 forms a character pattern from the character code by using the font information unit 26 and supplies it to the remote process controller 20. The remote process controller 20 outputs the character pattern to the network 4 through the output unit 29.

The input unit 21' of the printer (Y) receives the character pattern from the network 4 and sends it to the remote process controller 20'. The remote process controller 20' supplies the inputted character pattern to the development controller 24'.

Embodiment 2

Figure 5:
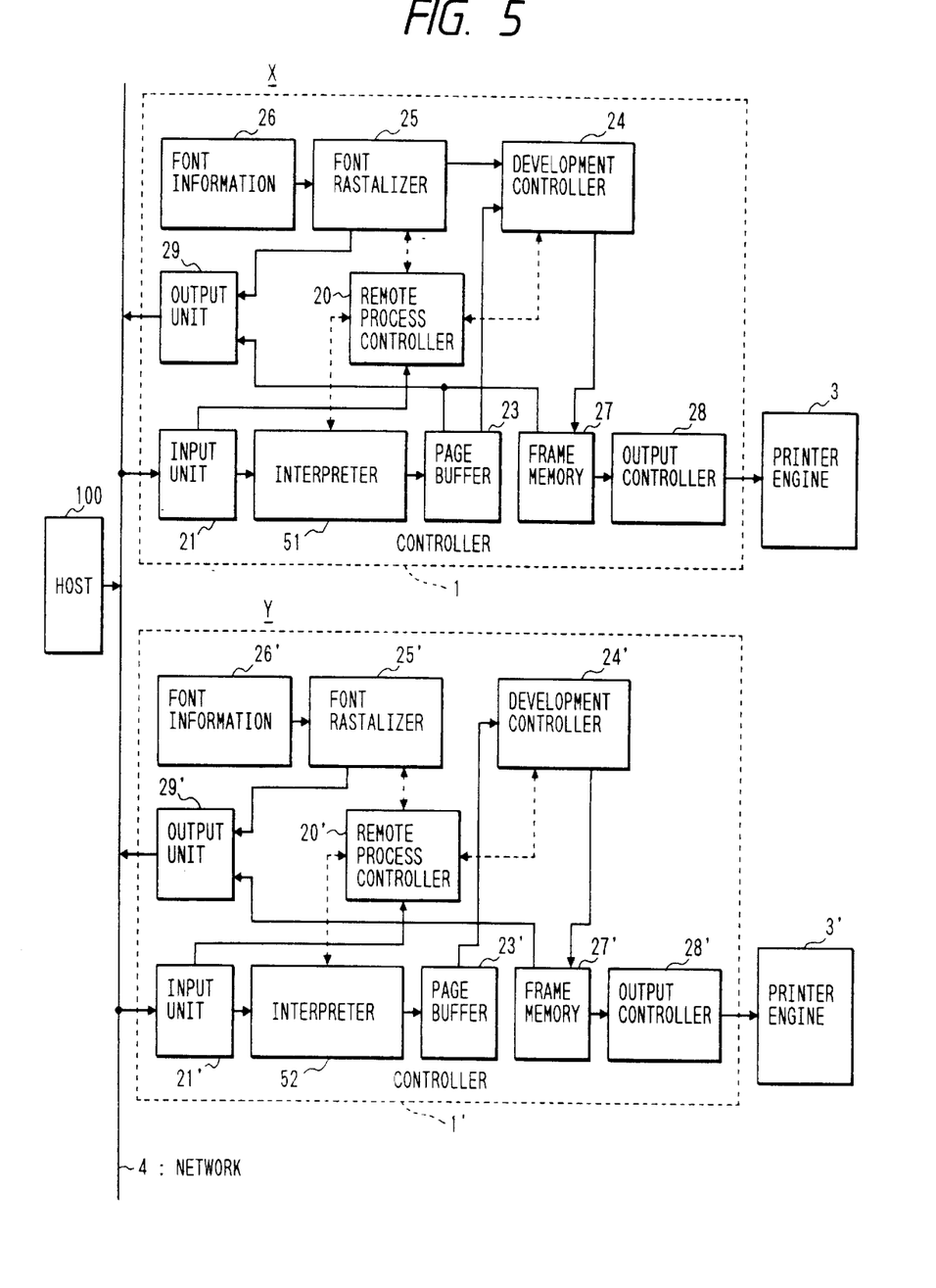
FIG. 5 is a system block diagram of the second embodiment.

The second embodiment of the invention will now be described with reference to FIG. 5. FIG. 5 differs from FIG. 4 with respect to a point that the controller 1 includes a first interpreter 51 and the controller 1' includes a second interpreter 52. The controller 1' includes a font rastalizer 25' and a font information unit 26'.

The same reference numerals as those of the embodiment shown in FIG. 4 are used in the second embodiment.

In the embodiment, the printer (X) differs from the printer (Y) with respect to the interpreters. Now, assuming that the printer (X) is a printer to interpret the first printer language and the printer (Y) is a printer to interpret the second printer language, a program to interpret the first printer language is stored in the first interpreter 51 and a program to interpret the second printer language is stored in the second interpreter 52.

The printer language denotes, for example, a page description language (PDL) or the like.

The operation when the first printer language is outputted from the host apparatus 100 to the printer (Y) through the network 4 in the state mentioned above will now be explained.

The input unit 21' of the printer (Y) receives the first printer language from the host apparatus 100 and sends it to the second interpreter 52. Since the second interpreter 52 cannot interpret the first printer language, the remote process controller 20' generates an interpreter request command to search for an interpreter which can interpret the first printer language.

As shown in the embodiment of FIG. 4, the remote process controller 20' generates the interpreter request command to search the interpreter which can interpret the first printer language to the network 4 through the output unit 29'. The interpreter request command is supplied to the printer input unit 21 and is sent to the remote process controller 20.

Since the remote process controller 20 knows that the printer (X) has the interpreter to interpret the first printer language, the ACK command is generated to the network 4 through the output unit 29. The input unit 21' of the printer (Y) receives the ACK command from the network 4 and supplies it to the remote process controller 20'. Consequently, in a manner similar to the embodiment shown in FIG. 4, the printer (Y) can use the first interpreter 51 of the printer (X).

The first printer language inputted to the second interpreter 52 is sent to the first interpreter 51 of the printer (X) through the remote process controller 20. Since the series of operations mentioned above are similar to the operations when the font rastalizer 25 is read as a first interpreter 51 in the embodiment of FIG. 4, its description is omitted here.

The first interpreter 51 interprets the inputted first printer language and forms intermediate data in the page buffer 23. After that, the first interpreter 51 allows the remote process controller 20 to control. The remote process controller 20 outputs the intermediate data in the page buffer 23 onto the network through the output unit 29.

The input unit 21' of the printer (Y) receives the intermediate data and sends it to the remote process controller 20'. The remote process controller 20' outputs the received intermediate data to the page buffer 23' and, after that, allows the development controller 24' to control. Since the subsequent operations are the same as those of the conventional apparatus, its description is omitted here. As mentioned above, the first printer language inputted from the host apparatus 100 to the printer (Y) is interpreted by the printer (X) and the intermediate data is formed. The intermediate data is obtained by the printer (Y) and is printed.

It is also possible to construct in a manner such that the printer (X) has a plurality of interpreters and the remote process controller 20 selects the interpreter designated by the interpreter request command received from the printer (Y) and the selected interpreter interprets the printer language received from the printer (Y).

Embodiment 3

Figure 6:
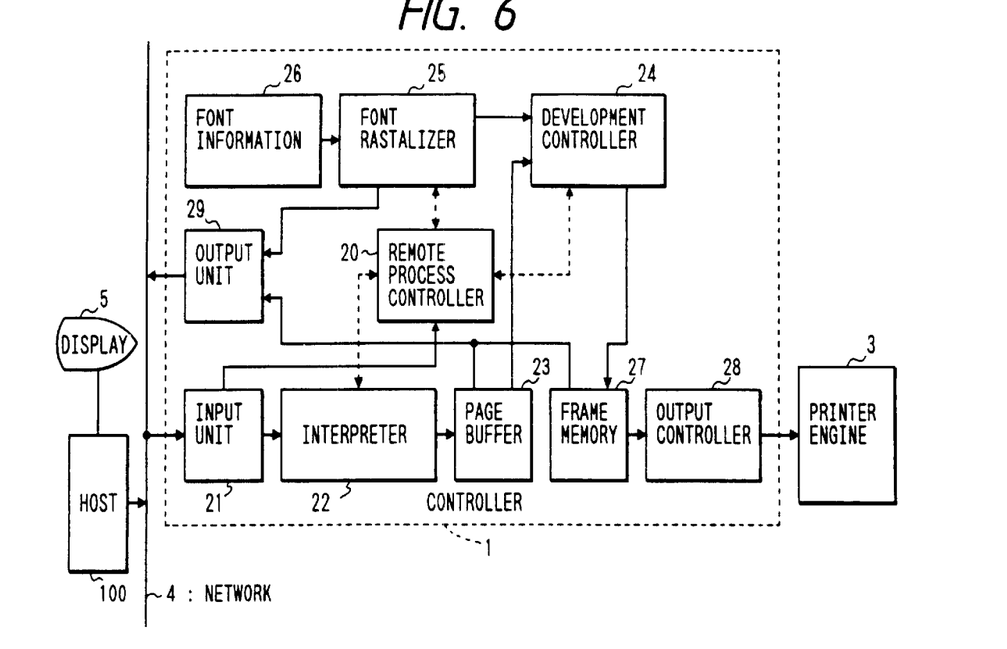
FIG. 6 is a system block diagram of the third embodiment.

The third embodiment of the invention will now be described with reference to FIG. 6. FIG. 6 differs from FIG. 5 with respect to a point that the controller 1' and printer engine 3' don't exist and the host apparatus 100 has a display 5.

The third embodiment relates to a previewer. The host apparatus 100 doesn't directly output the input data to the network 4, but as mentioned in the embodiments 1 and 2, the development controller 24 first opens the communication path so that the remote process can be executed, and the print data is supplied to the development controller 4 through the communication path.

The host apparatus 100 generates a "remote-fontraster" command to the network 4 and the input unit 21 receives the command and sends it to the remote process controller 20. The remote process controller 20 makes the component elements of the controller 1 operative and forms the bit map data for the frame memory 27 by using the print data which is inputted after that from the host apparatus 100 in a manner similar to the operations of the conventional apparatus.

At this time point, the remote process controller 20 outputs the bit map data in the frame memory 27 to the network 4 through the output unit 29. The host apparatus 100 receives the bit map data in the frame memory from the network 4 and outputs to the display 5. Consequently, the print data can be previewed by the display 5.

It is also possible to output the bit map data in the frame memory 27 to another printer, thereby printing.

According to the invention as described above, the resources of the printer can be commonly used with another printer and the host apparatus.

What is claimed is:

1. A print control apparatus, connected to a plurality of external apparatuses via a network, for controlling a printer to perform printing based on data received from a data supply source, said print control apparatus comprising:

receiving means for receiving first data from the data supply source;

determining means for determining whether the first data includes second data that should be analyzed by another apparatus;

selecting means for selecting one of the plurality of external apparatuses as a selected external apparatus for analyzing the second data;

transmitting means for transmitting the second data to the selected external apparatus if said determining means determines that the first data includes the second data, wherein the selected external apparatus generates third data based on the second data and transmits the third data back to said print control apparatus; and control means for controlling the printer to perform printing based on the first and third data.

2. A print control apparatus according to claim 1, wherein said selecting means broadcasts a processing request command on the network and selects one of the plurality of external apparatuses on the basis of a signal received back from the one external apparatus in response to the processing request command.

3. A print control apparatus according to claim 2, wherein said selecting means selects the one external apparatus upon recognizing the signal received back from the one external apparatus.

4. A print control apparatus according to claim 1, wherein said transmitting means transmits to the selected external apparatus, the second data together with a command for processing the second data using a font rasterizer.

5. A print control apparatus according to claim 1, wherein said transmitting means transmits to the selected external apparatus, the second data together with a command for processing the second data using a predetermined emulation program.

6. A method for controlling a print control apparatus, connected to a plurality of external apparatuses via a network, to control a printer to perform printing based on data received from a data supply source, said method comprising the steps of:

receiving first data from the data supply source;

determining whether the first data includes second data that should be analyzed by another apparatus;

selecting one of the plurality of external apparatuses as a selected external apparatus for analyzing the second data;

transmitting the second data to the selected external apparatus if it is determined, in said determining step, that the first data includes the second data, wherein the selected external apparatus generates third data based on the second data and transmits the third data back to the print control apparatus; and controlling the printer to perform printing based on the first and third data.

7. A method according to claim 6, wherein said selecting step broadcasts a processing request command on the network and selects one of the plurality of external apparatuses on the basis of a signal received back from the one external apparatus in response to the processing request command.

8. A method according to claim 7, wherein said selecting step selects the one external apparatus upon recognizing the signal received back from the one external apparatus.

9. A method according to claim 6, wherein said transmitting step includes transmitting to the selected external apparatus, the second data together with a command for processing the second data using a font rasterizer.

10. A method according to claim 6, wherein said transmitting step includes transmitting to the selected external apparatus, the second data together with a command for processing the second data using a predetermined emulation program.

11. An apparatus connected to at least one external apparatus via a network for processing data received from a data supply source, said apparatus comprising:

first receiving means for receiving first data from the data supply source via the network;

determining means for determining whether the first data includes second data to be processed by one of the at least one external apparatus;

transmitting means for transmitting the second data to the one external apparatus via the network if said determining means determines that the first data includes the second data;

second receiving means for receiving third data transmitted from the one external apparatus via the network in response to the second data transmitted by said transmitting means; and processing means for processing data based on the first and third data.

12. An apparatus according to claim 11, further comprising specifying means for specifying the one external apparatus among the at least one external apparatus.

13. An apparatus according to claim 12, wherein said specifying means comprises means for broadcasting an inquiry command about a function of processing the second data via the network.

14. An apparatus according to claim 11, wherein said transmitting means transmits to the one external apparatus the second data together with a command for processing the second data using a font rasterizer.

15. An apparatus according to claim 11, wherein said transmitting means transmits to the one external apparatus the second data together with a command for processing the second data using a predetermined emulation program.

16. A method for controlling an apparatus connected to at least one external apparatus via a network, to perform processing based on data received from a data supply source, said method comprising the steps of:

receiving first data from the data supply source via the network;

determining whether the first data includes second data to be processed by one of the at least one external apparatus;

transmitting the second data to the one external apparatus via the network if it is determined, in said determining step, that the first data includes the second data;

receiving third data transmitted from the one external apparatus via the network in response to the second data transmitted in said transmitting step; and processing data based on the first and third data.

17. A method according to claim 16, further comprising the step of specifying the one external apparatus among the at least one external apparatus.

18. A method according to claim 17, wherein said specifying step comprises broadcasting an inquiry command about a function of processing the second data via the network.

19. A method according to claim 16, wherein said transmitting step comprises transmitting to the one external apparatus the second data together with a command for processing the second data using a font rasterizer.

20. A method according to claim 16, wherein said transmitting stop comprises transmitting to the one external apparatus the second data together with a command for processing the second data using a predetermined emulation program.

21. A method of executing a job in a network system including a plurality of devices, said method comprising the steps of:

when a print job is received from a client via the network by one of the plurality of devices, determining a certain one of a plurality of sub-print-jobs included in the received print job to be executed by another one of the plurality of devices;

selecting one device from among the plurality of devices to execute the determined sub-print-job;

transmitting the determined sub-print-job to the selected device for execution of the sub-print-job; and receiving execution results of the sub-print-job from the selected device and then executing the received print job.

22. An apparatus for executing a job in a network system including a plurality of devices, comprising:

determining means for, when a print job is received from a client via the network by one of the plurality of devices, determining a certain one of a plurality of sub-print-jobs included in the received print job to be executed by another one of the plurality of devices;

selecting means for selecting one device from among the plurality of devices to execute the determined sub-print-job;

transmitting means for transmitting the determined sub-print-job to the selected device for execution of the sub-print-job; and receiving means for receiving execution results of the sub-print-job from the selected device and then executing the received print job.

* * * * *

UNITED STATES PATENT AND TRADEMARK OFFICE
CERTIFICATE OF CORRECTION

PATENT NO. : 6,397,265 B1
DATED : May 28, 2002
INVENTOR(S) : Shinichi Iwamoto et al.

It is certified that error appears in the above-identified patent and that said Letters Patent is hereby corrected as shown below:

<u>Title page,</u>
Item [56], References Cited, U.S. PATENT DOCUMENTS,
"476,486 A 8/1892 Ketelhut et al. .... 710/12" should be deleted.

<u>Drawings,</u>
Sheet 3, Fig. 4, "RASTALIZER" should read -- RASTERIZER --.
Sheet 4, Fig. 5, "RASTALIZER" (both occurrences) should read -- RASTERIZER --.
Sheet 5, Figs. 6 and 7, "RASTALIZER" (both occurrences) should read
-- RASTERIZER --.

<u>Column 1,</u>
Lines 38, 58 and 62, "rastalizer 25" should read -- rasterizer 25 --.
Line 40, "rastalizer" should read -- rasterizer --.
Line 46, "rastalizer 25;" should read -- rasterizer 25; --.

<u>Column 2,</u>
Line 46, "cross sectional" should read -- cross-sectional --.

<u>Column 3,</u>
Line 4, "cross sectional" should read -- cross-sectional --.
Line 47, "is come," should read -- comes --.
Line 54, "function" should read -- functioning --.

<u>Column 4,</u>
Line 2, "is come," should read -- comes --.
Line 65, "rastalizer" should read -- rasterizer --.

<u>Column 5,</u>
Line 3 and 15, "rastalizer 25," should read -- rasterizer 25, --.
Lines 5, 59, 60, 61, 62 and 65, "rastalizer" should read -- rasterizer --.
Line 44, "rastalizer 25" should read -- rasterizer 25 --.

UNITED STATES PATENT AND TRADEMARK OFFICE
CERTIFICATE OF CORRECTION

PATENT NO.    : 6,397,265 B1
DATED         : May 28, 2002
INVENTOR(S)   : Shinichi Iwamoto et al.

It is certified that error appears in the above-identified patent and that said Letters Patent is hereby corrected as shown below:

Column 6,
Line 1, "rastalizer 25" should read -- rasterizer 25 --; and "rastalizer" should read -- rasterizer --.
Line 6, "rastalizer 25," should read -- rasterizer 25, --.
Line 7, "rastalizers." should read -- rasterizers. --.
Lines 8 and 9, "rastalizer" should read -- rasterizer --.
Line 14, "rastalizer" (both occurrences) should read -- rasterizer --
Lines 18, 19, 32 and 60, "rastalizer 25" should read -- rasterizer 25 --.
Line 45, "rastalizer 25." should read -- rasterizer 25. --; and "rastalizer 25" should read -- rasterizer 25 --.

Column 7,
Line 37, "rastalizer 25" should read -- rasterizer 25 --.

Column 8,
Line 5, "development controller 4" should read -- development controller 24 --.

Column 10,
Line 29, "stop" should read -- step --.

Signed and Sealed this

Eighteenth Day of March, 2003

JAMES E. ROGAN
*Director of the United States Patent and Trademark Office*